(12) United States Patent
Strutt

(10) Patent No.: US 7,072,618 B1
(45) Date of Patent: Jul. 4, 2006

(54) ADAPTIVE THRESHOLD SELECTION SYSTEM AND METHOD FOR DETECTION OF A SIGNAL IN THE PRESENCE OF INTERFERENCE

(75) Inventor: Guenael Strutt, Sanford, FL (US)

(73) Assignee: MeshNetworks, Inc., Maitlands, FL (US)

( * ) Notice: Subject to any disclaimer, the term of this patent is extended or adjusted under 35 U.S.C. 154(b) by 691 days.

(21) Appl. No.: 10/023,992

(22) Filed: Dec. 21, 2001

(51) Int. Cl.
*H04B 17/00* (2006.01)

(52) U.S. Cl. .............................. 455/67.13; 455/67.11; 455/67.16; 455/70; 375/150; 375/317; 375/343

(58) Field of Classification Search ............. 455/67.11, 455/67.13, 67.16, 70, 71; 375/343, 150, 375/317
See application file for complete search history.

(56) References Cited

U.S. PATENT DOCUMENTS

| | | | |
|---|---|---|---|
| 4,494,192 A | 1/1985 | Lew et al. ................... | 364/200 |
| 4,617,656 A | 10/1986 | Kobayashi et al. ........... | 370/74 |
| 4,736,371 A | 4/1988 | Tejima et al. ................. | 370/95 |
| 4,742,357 A | 5/1988 | Rackley ....................... | 342/457 |
| 4,747,130 A | 5/1988 | Ho ............................... | 379/269 |
| 4,910,521 A | 3/1990 | Mellon ......................... | 342/45 |
| 5,034,961 A | 7/1991 | Adams ......................... | 375/130 |
| 5,068,916 A | 11/1991 | Harrison et al. .............. | 455/39 |
| 5,231,634 A | 7/1993 | Giles et al. ................. | 370/95.1 |
| 5,233,604 A | 8/1993 | Ahmadi et al. ............... | 370/60 |
| 5,241,542 A | 8/1993 | Natarajan et al. .......... | 370/95.3 |
| 5,317,566 A | 5/1994 | Joshi ............................ | 370/60 |
| 5,392,450 A | 2/1995 | Nossen ....................... | 455/12.1 |
| 5,412,654 A | 5/1995 | Perkins ....................... | 370/94.1 |
| 5,424,747 A | 6/1995 | Chazelas et al. ............. | 342/70 |
| 5,502,722 A | 3/1996 | Fulghum ................... | 370/69.1 |
| 5,517,491 A | 5/1996 | Nanni et al. ................... | 370/29 |
| 5,555,425 A | 9/1996 | Zeller et al. ................. | 395/800 |
| 5,555,540 A | 9/1996 | Radke ........................ | 370/16.1 |
| 5,572,528 A | 11/1996 | Shuen ..................... | 370/85.13 |
| 5,615,212 A | 3/1997 | Ruszczyk et al. ........... | 370/433 |

(Continued)

FOREIGN PATENT DOCUMENTS

CA 2132180 3/1996

(Continued)

OTHER PUBLICATIONS

Wong et al., "Soft Handoffs in CDMA Mobile Systems", Dec. 1997, IEEE Personal Communications.

(Continued)

*Primary Examiner*—Duc Nguyen
*Assistant Examiner*—Tuan Pham
(74) *Attorney, Agent, or Firm*—Randi L. Karpinia; Joseph J. Buczynski

(57) ABSTRACT

A system and method for providing adaptive threshold selection for detecting a signal in the presence of interference or noise. The system and method thus enables a node, such as a mobile user terminal, in an ad-hoc communications network to reduce the number of false alarms it experiences in the detection of communications signals due to, for example, sudden noise bursts or reception of a high powered signal that overloads the automatic gain control (AGC) device of the receiver in the node. The system and method employ two correlation circuits which correlate the received signal with two reference sequences and output a correlated signal, a threshold generating circuit which generates a threshold value based on the estimation of the variance of the output of the first correlation circuit, and a comparison circuit which compares the correlated signal to the threshold value to determine whether the received signal includes a valid data signal, as opposed to only noise.

10 Claims, 5 Drawing Sheets

U.S. PATENT DOCUMENTS

| | | | |
|---|---|---|---|
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,642,377 A | 6/1997 | Chung et al. | 375/200 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,724,384 A * | 3/1998 | Kim et al. | 375/149 |
| 5,745,483 A | 4/1998 | Nakagawa et al. | 370/335 |
| 5,774,876 A | 6/1998 | Woolley et al. | 705/28 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,049,576 A | 4/2000 | Magill | 375/365 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,088,383 A * | 7/2000 | Suzuki et al. | 375/148 |
| 6,104,712 A | 8/2000 | Robert et al. | 370/289 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,223,240 B1 | 4/2001 | Odenwald et al. | 710/129 |
| 6,229,475 B1 * | 5/2001 | Woolley | 342/93 |
| 6,229,842 B1 | 5/2001 | Schulist et al. | 375/148 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,424,673 B1 * | 7/2002 | Chen et al. | 375/149 |
| 6,606,349 B1 * | 8/2003 | Kudhrethaya et al. | 375/150 |
| 6,643,320 B1 * | 11/2003 | Wilcox et al. | 375/150 |
| 6,683,924 B1 * | 1/2004 | Ottosson et al. | 375/343 |
| 6,847,676 B1 * | 1/2005 | Ng et al. | 375/142 |
| 2001/0053699 A1 | 12/2001 | McCrady et al. | 455/513 |
| 2004/0009749 A1 * | 1/2004 | Arazi et al. | 455/41.2 |

FOREIGN PATENT DOCUMENTS

| | | |
|---|---|---|
| EP | 0513841 A2 | 11/1992 |
| EP | 0513841 A3 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms", Jul. 2000, IEEE Journal of Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless AD Hoc Network Routing Protocol", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Sef-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANS".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

ADAPTIVE THRESHOLD SELECTION SYSTEM AND METHOD FOR DETECTION OF A SIGNAL IN THE PRESENCE OF INTERFERENCE

BACKGROUND OF THE INVENTION

1. Field of the Invention

The present invention relates to a system and method for enabling a node, such as a mobile user terminal in a wireless communications network, to adaptively detect a signal in the presence of interference. More particularly, the present invention relates to a system and method for enabling a node in an ad-hoc packet-switched communications network to detect the presence of a sequence in the presence of noise when the sequence is transmitted.

2. Description of the Related Art

Wireless communications networks, such as mobile wireless telephone networks, have become increasingly prevalent over the past decade. These wireless communications networks include terrestrial cellular telephone networks, satellite-based telephone networks, and terrestrial or satellite wireless data communications networks, to name a few.

When terminals, such as wireless mobile user terminals, in any of these types of communications networks communicate with one another, the communication signal can contain noise. This noise can be caused by interfering signals from other user terminals, as well as other factors such as thermal noise, environmental noise, and so on.

In most applications, fixed synchronization techniques are used to detect noise in a network. That is, a fixed acceptable noise level is set by the receiver. Any signal having a power level below the fixed noise level is considered to be noise, and any signal having a power level above this level is considered to be a valid signal.

However, as can be appreciated by one skilled in the art, noise levels and signal levels are not constant. Furthermore, the known fixed synchronization techniques do not account for these variances Various other techniques exist for distinguishing a valid received signal from noise. For example, U.S. Pat. No. 6,229,842 to Schulist et al., the entire contents of which being incorporated herein by reference, discloses a system and method for detecting and selecting peaks in a delay power profile (DPP) signal being received by a direct sequence code division multiple access (DS-CDMA) spread spectrum receiver. The system and method calculate an adaptive threshold which is used to determine valid paths in the DPP signal. Specifically, the adaptive threshold is determined by measuring the signal-to-noise ratio of the DPP signal using an iterative process in which a raw estimate and an improved estimate are made of the noise, and the threshold is set to minimize non-detections and false alarms in the path estimation.

Furthermore, U.S. Pat. No. 5,724,384 to Kim et al., the entire contents of which being incorporated herein by reference, discloses a pseudo-noise code synchronization device which employs an adaptive threshold in a spread spectrum receiver. The receiver is capable of performing a stable pseudo noise code synchronization of a received spread spectrum signal by varying the threshold according to the variance of the received spread spectrum signal. In addition, U.S. Pat. No. 5,642,377 to Chung et al., the entire contents of which being incorporated herein by reference, discloses a PN code acquisition system for Code Division Multiple Access (CDMA) Direct Sequence Spread Spectrum (DSSS) systems that adaptively estimates optimal threshold by exploiting the statistics of the signal and noise, and making an optimal decision based on the threshold.

In addition, U.S. Pat. No. 6,049,576 to Magill, the entire contents of which being incorporated herein by reference, discloses a communication system for communicating between a plurality of stations. At the RF transmitters, a synchronization word signal is periodically inserted in a data stream to assist the stations in achieving timing and frequency accuracy to successfully demodulate a received data stream, as well as to minimize the length and duty factor of the synchronization (sync) word and the time required to acquire synchronization. The synchronization word signal is generated from a Kronecker product code and the RF receivers have detectors detecting Kronecker product code synchronization word and achieving synchronization.

As shown in FIG. 1, the system includes a dual-stage coherent matched filter where the product nature of the code has been utilized to reduce the number of required taps. The first stage, stage A, of the matched filtering is accomplished by a tapped delay line DL-1 whose coefficients are matched to the high rate code. In this example it is assumed that there are two samples per chip. Thus, each high rate chip is represented by two taps (C0, C0, C1, C1 . . . C19, C19), and the delay associated with each tap is one-half of a high rate chip duration. The second stage, stage B, of matched filtering operates on the output from summer S1 of the first stage of matched filtering. For this stage, the tap spacing is one low rate chip in duration and there is only one tap per chip (A0, A1, A2, A3 . . . A23). The sampling rate is not reduced in this second stage and it is necessary to have as many shift register stages as twice the length of the product code. The number of taps is greatly reduced with respect to the number that would exist if one were to directly matched filter to the product code in a single stage.

As indicated in FIG. 1, the Magill system further includes a comparator that compares the output of stage B with a fixed threshold. Because the system uses a fixed threshold, it is generally unsuitable for anticipating variations in the input signal. Therefore, it is not suitable in networks which require that the system be adaptable to variations in the input signal.

For example, in recent years, a type of mobile communications network known as an "ad-hoc" network has been developed for use by the military. In this type of network, each user terminal (hereinafter "mobile node") is capable of operating as a base station or router for the other mobile nodes, thus eliminating the need for a fixed infrastructure of base stations. Accordingly, data packets being sent from a source mobile node to a destination mobile node are typically routed through a number of intermediate mobile nodes before reaching the destination mobile node. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other types of user terminals, such as those on the public switched telephone network (PSTN) and on other networks such as the Internet. Details of these types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each of said patent applications being incorporated herein by reference.

As with the conventional types of communications networks discussed above, communication signals being transmitted and received by user terminals in an ad-hoc communications network are also susceptible to noise that results from interfering signals from other user terminals, thermal noise, environmental noise, and so on. Accordingly, a need exists for a system and method which enables a node in an ad-hoc communications network to accurately detect a signal in the presence of noise in such a manner to minimize false alarms in signal detection.

SUMMARY OF THE INVENTION

An object of the present invention is to provide a system and method for providing adaptive threshold selection for detecting a signal in the presence of interference or noise.

Another object of the present invention is to provide a system and method for enabling a node, such as a mobile user terminal, in an ad-hoc communications network to reduce the number of false alarms it experiences in the detection of communications signals due to, for example, sudden noise bursts or reception of a high powered signal that overloads the automatic gain control (AGC) device of the receiver in the node.

These and other objects are substantially achieved by providing a system and method for enabling a node, adapted for use in a wireless communications network, to detect a data signal in a received signal containing noise. The system and method employ two correlation circuits which correlate the received signal with two reference sequences and output a correlated signal, a threshold generating circuit which generates a threshold value based on the variance of said received signal over time, and a comparison circuit which compares the correlated signal to the threshold value to determine whether the received signal includes a valid data signal, as opposed to only noise. The threshold generating circuit includes a variance estimation circuit which averages the received signal over a period of time and outputs an estimate of the variance, and a scaling circuit which mathematically combines (e.g., multiplies) the estimate of the variance with a constant to output the threshold value. The comparison circuit thus outputs a detection signal indicating detection of the data signal in the received signal when a level of the correlated signal is at least equal to the threshold value, and outputs a non-detection signal indicating non-detection of the data signal in the received signal when a level of the correlated signal is less than the threshold value.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
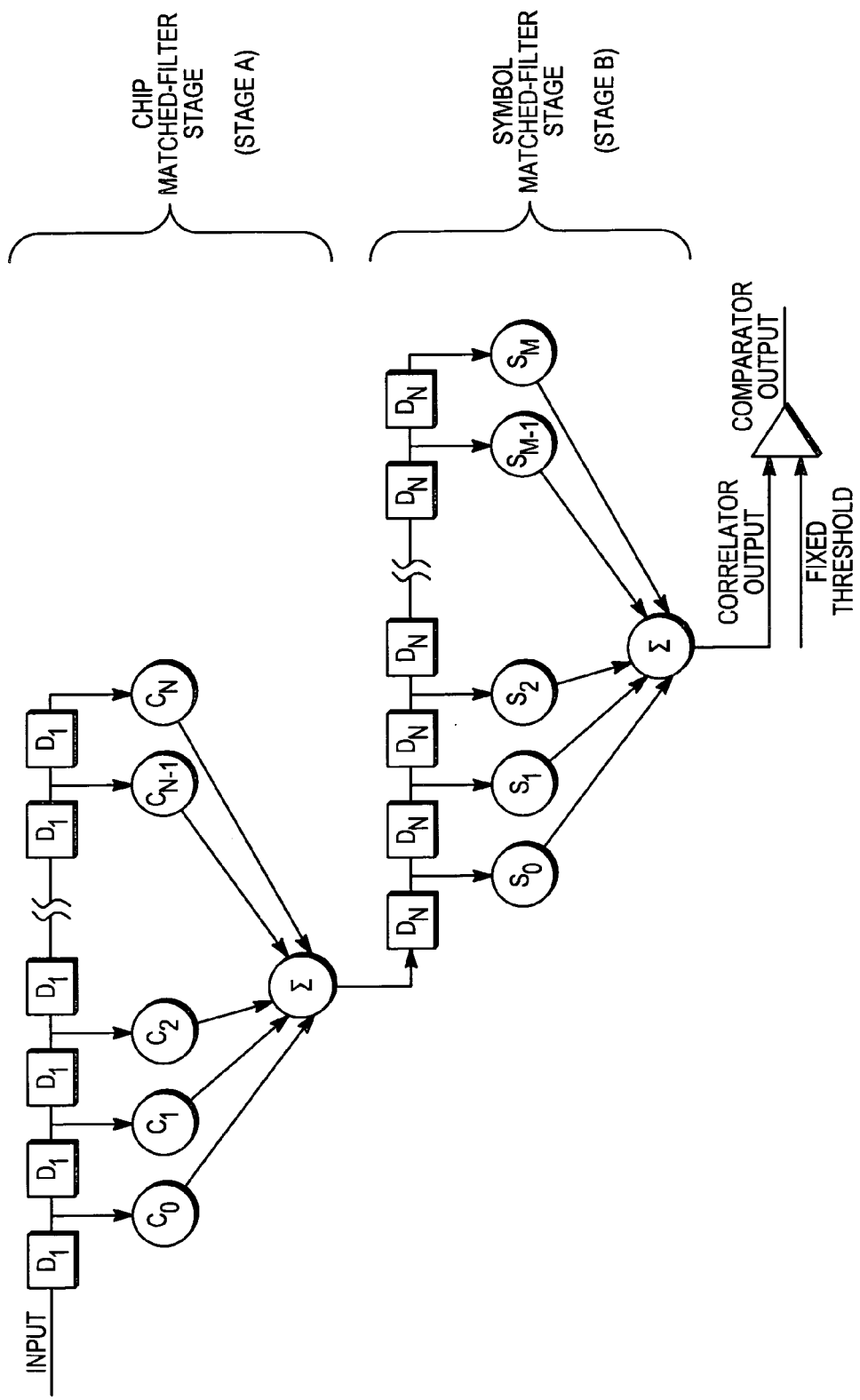
FIG. 1 is a schematic block diagram of a known dual-stage coherent matched filter arrangement for synchronizing transmission signals.
Figure 2:
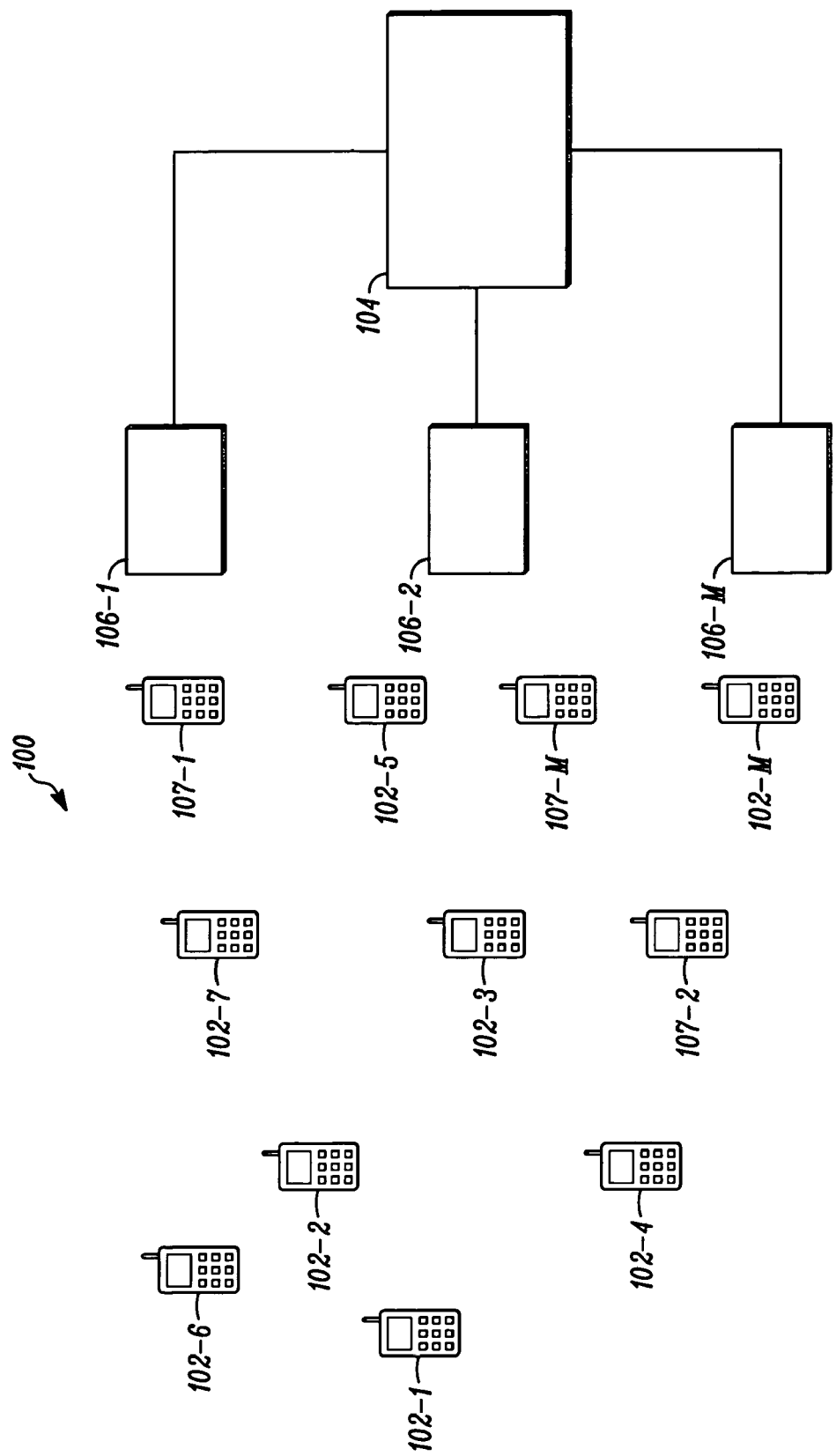
FIG. 2 is a block diagram of an example of an ad-hoc packet-switched wireless communications network employing a system and method for enabling a node, such as a mobile user terminal, in the network to apply adaptive selection to detect a signal in the presence of interference according to an embodiment of the present invention.

FIG. 2 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102), and a fixed network 104 having a plurality of access points 106-1, 106-2, ..., 106-n (referred to generally as nodes 106 or access points 106), for providing the nodes 102 with access to the fixed network 104. The fixed network 104 includes, for example, a core local access network (LAN), and a plurality of servers and gateway routers, to thus provide the nodes 102 with access to other networks, such as the public switched telephone network (PSTN) and the Internet. The network 100 further includes a plurality of fixed routers 107-1 through 107-1 (referred to generally as nodes 107) that are capable of routing data packets to other nodes 102, 106 or 107.

Figure 3:
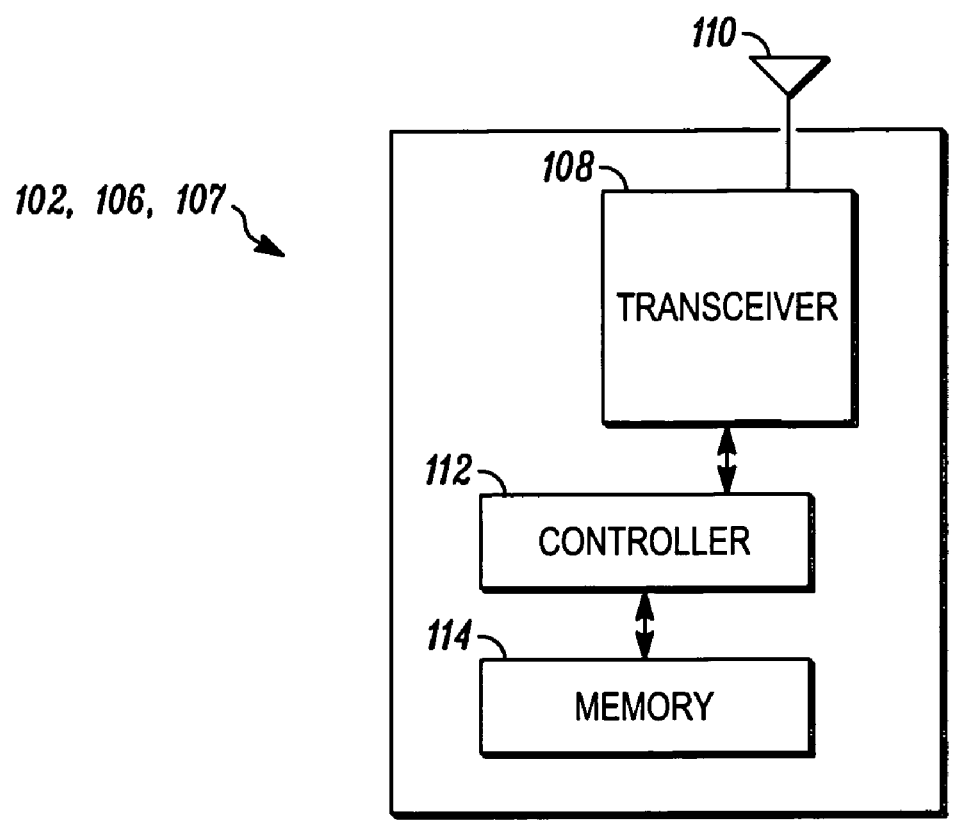
FIG. 3 is a block diagram illustrating an example of components of a node employed in the network shown in FIG. 1.

As can be appreciated by one skilled in the art, the nodes 102 are capable of communicating with each other directly, or via one or more other nodes 102 operating as a router or routers for data packets being sent between nodes 102, 106 or 107, as described in U.S. Pat. No. 5,943,322 to Mayor and in U.S. patent application Ser. Nos. 09/897,790, 09/815,157 and 09/815,164, referenced above. Specifically, as shown in FIG. 3, each node 102, 106 or 107 includes a transceiver 108 which is coupled to an antenna 110 and is capable of receiving and transmitting signals, such as packetized data signals, to and from the node 102, 106 or 107, under the control of a controller 112. The packetized data signals can include, for example, voice, data or multimedia. As discussed in more detail below, the transceiver includes a circuit for adaptively detecting a signal in the presence of interference.

Each node 102, 106 or 107 further includes a memory 114, such as a random access memory (RAM), that is capable of storing, among other things, routing information pertaining to itself and other nodes 102, 106 or 107 in the network 100. The nodes 102, 106 or 107 exchange their respective routing information, referred to as routing advertisements or routing table information, with each other via a broadcasting mechanism periodically, for example, when a new node 102 enters the network 100, or when existing nodes 102 in the network 100 move. A node 102, 106 or 107 will broadcast its routing table updates, and nearby nodes 102, 106 or 107 will only receive the broadcast routing table updates if within radio frequency (RF) range of the broadcasting node 102, 106 or 107. Each of the nodes 102, 106 or 107 that receive the routing table information from a neighboring node 102, 106 or 107 can store all or a relevant portion of that routing table information in their respective memory 114.

Figure 4:
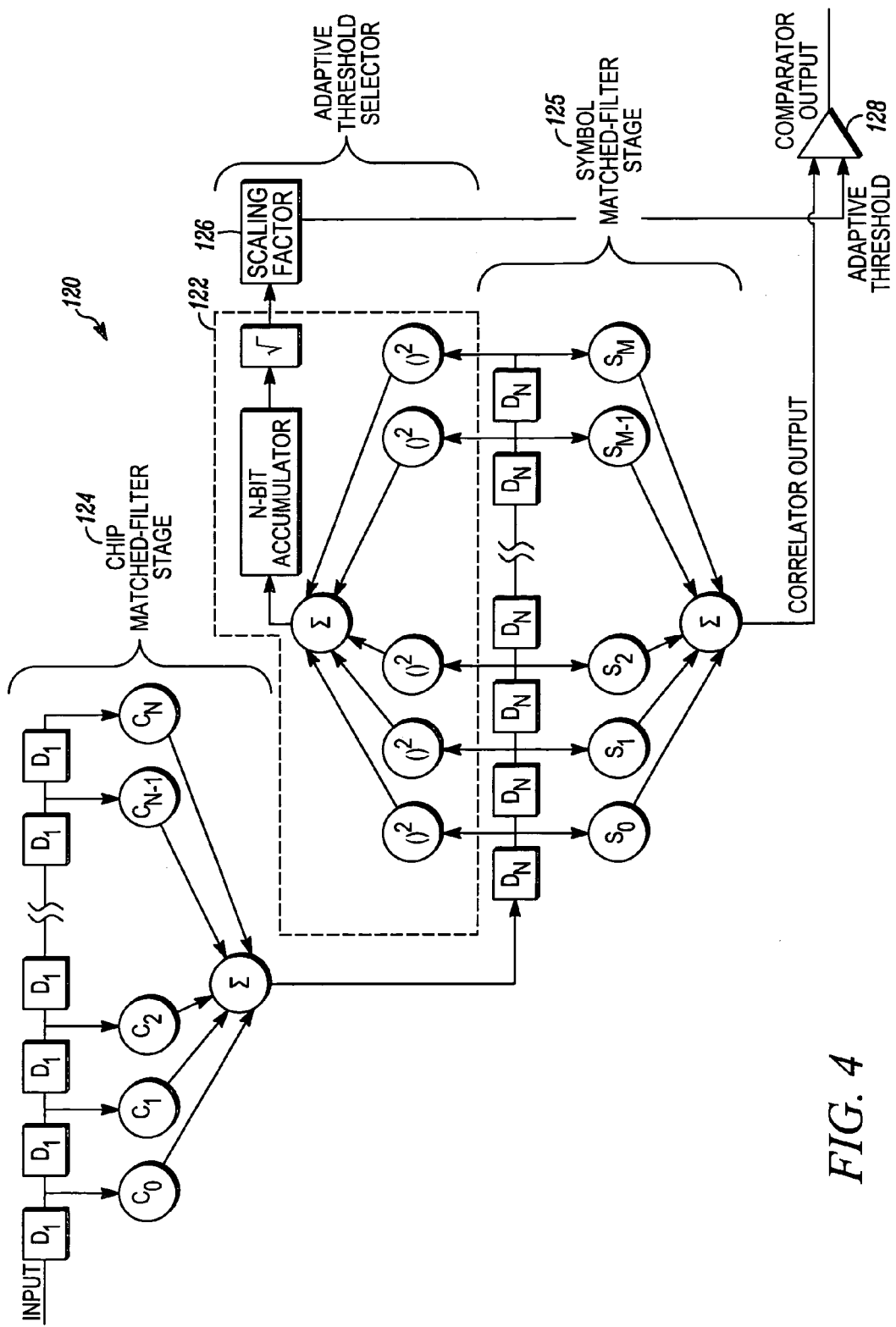
FIG. 4 is a schematic block diagram illustrating an example of a circuit employed in the transceiver of the node shown in FIG. 3 for performing adaptive selection for detecting a signal in the presence of interference according to an embodiment of the present invention.

An embodiment of the present invention will now be discussed with reference to FIGS. 2–5. Specifically, FIG. 4 is a block diagram of a circuit 120 for performing adaptive selection of a threshold for detecting a signal in the presence of interference according to an embodiment of the present invention. As mentioned above, the circuit 120 can be employed in the transceiver 108 of a node 102, 106 or 107 and, in particular, can be coupled to the signal receiving circuitry of the transceiver 108. The circuit 120 comprises a variance estimation circuit 122 including multiple squaring circuits, an accumulator and a circuit for taking the square root of the output of the accumulator. The circuit 120 further comprises two correlation circuits 124 and 125, a scaling circuit 126, and a comparison circuit 128 as will now be described.

Figure 5:
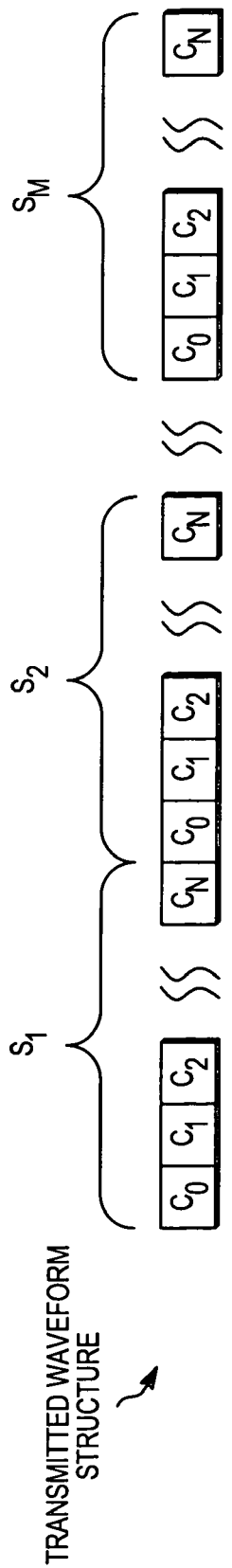
FIG. 5 illustrates an example of the reference signal in relation to the transmitted waveform structure as employed in the circuit shown in FIG. 4.

The circuit 120 receives input data, such as packetized data received by the transceiver 108, into both the variance estimation circuit 122 and the correlation circuits 124 and 125. A reference signal as shown in FIG. 5, which is embedded in the input signal, is also input to the correlation circuit 124.

The output of the correlation circuit 125 represents the correlated input data signal. The comparison circuit 128 compares the magnitude of correlated input data signal with the threshold value output from the variance estimation circuit 122 as scaled by the scaling circuit 126. When the magnitude of the correlated input data signal equals or exceeds the threshold value, the comparison circuit 128 outputs a signal indicating that a valid data signal has been received. However, when the magnitude of the correlated input data signal is less than the threshold value, the comparison circuit 128 outputs a signal indicating that a valid data signal has not been received. The controller 112, for example, can thus interpret the output of comparison circuit 128 to determine whether a valid signal has been received, and the manner in which to control the node 102, 106 or 107 accordingly.

As can be appreciated from the above, the adaptive threshold selection according to an embodiment of the present invention is applied where there are high variations of noise amplitude in the network 100. This noise includes, but is not limited to thermal noise, environmental noise and near-orthogonal signals that are extraneous to the desired data signals and should be ignored.

Unlike a conventional noise detection system which usually only has an automatic gain control (AGC) at the input to the system to adjust the gain of the received signal, the circuit 120 adaptively detects noise, which can be in the form of a high amplitude noise signal, and adjusts the threshold value accordingly. Thus, the number of false detections of a valid data signal is minimized.

It will also be appreciated by those skilled in the art that the circuit 120 discussed above according to an embodiment of the present invention determines the threshold based on the estimation of the variance of the signal (which will be referred to as "correlation noise") at the output of the first correlator stage. This technique differs from conventional methods such as that described in U.S. Pat. No. 5,724,384 to Kim et al., referenced above, where the estimation of the variance is based on the input signal. Therefore, this method is well suited for a use in CDMA (code-division multiple access) systems where interference from other users using different spreading codes can be characterized by its high correlation noise (relative to thermal noise). Because of this increased correlation noise, it is probable that the output of the correlator will present a spurious peak corresponding to the point at which the un-correlated sequence used by a different user lines up with the ideal correlated symbol sequence ($S_1$ through $S_M$). Probing the variance of the input signal would not increase the threshold accordingly and would not prevent a false alarm from occurring.

Another unforeseen advantage of the technique realized by the circuit shown in FIG. 4 over conventional techniques is the ability to adjust to significant variations in input signal amplitude during a relatively short period of time. Although a variance estimation may be useful on a short time frame to select an adaptive threshold, conventional mechanisms such as that described in U.S. Pat. No. 5,724,384 to Kim et al., referenced above, would require unnecessarily long delay lines to anticipate any important variation in input signal amplitude. Since the variance estimation circuit 122 probes the output of the initial matched-filter stage at points in time which are separated by delay-lines of length N, the threshold value adapts to correlated noise variations which predate the correlation peak by several symbols.

In summary, the code acquisition and signal detection circuit 120 is capable of effectively and efficiently recognizing a valid data signal in a received signal stream. The circuit is therefore capable of recognizing a signal coming from a particular node 102, 106 or 107 among signals coming from several nodes 102, 106 or 107, by selecting in-synch matched filter samples, which operate rapidly and at low signal to noise ratios. The circuit 120 is further adapted to be implemented in a single application specific integrated circuit (ASIC), thus reducing the overall complexity of the system.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A system for enabling a node, adapted for use in a wireless communications network, to detect a data signal in a received signal noise, said system comprising:
   a first correlation circuit, adapted to correlate said received signal with a first reference sequence, and output an intermediate correlated signal;
   a second correlation circuit, adapted to correlate said intermediate correlated signal with a second reference sequence, and output a correlated signal;
   a threshold generating circuit, adapted to generate a threshold value based on an estimation of the variance of said intermediate correlated signal over time; and
   a comparison circuit, adapted to compare said correlated signal to said threshold value to determine whether said received signal includes said data signal.

2. A system as claimed in claim 1, wherein:
   said threshold generating circuit includes a variance estimation circuit, adapted to average said intermediate correlated signal over a period of time and output an estimate of the variance signal; and
   a scaling circuit, adapted to mathematically combine said estimate of the variance signal with a constant to output said threshold value.

3. A system as claimed in claim 2, wherein:
   said scaling circuit multiplies said estimate of the variance signal with said constant to output said threshold value.

4. A system as claimed in claim 1, wherein:
said comparison circuit outputs a detection signal indicating detection of said data signal in said received signal when a level of said correlated signal is at least equal to said threshold value; and
said comparison circuit outputs a non-detection signal indicating non-detection of said data signal in said received signal when a level of said correlated signal is less than said threshold value.

5. A method for enabling a node, adapted for use in a wireless communications network, to detect a data signal in a received signal containing noise, said method comprising:
performing a first correlation operation to correlate said received signal with a first reference sequence, and output an intermediate correlated signal;
performing a second correlation operation to correlate said intermediate correlated signal with a second reference sequence, and output a correlated signal;
generating a threshold value based on an estimate of the variance of said intermediate correlated signal over time; and
comparing said correlated signal to said threshold value to determine whether said received signal includes said data signal.

6. A method as claimed in claim 5, wherein said threshold generating includes:
estimating the variance of said intermediate correlated signal over a period of time and output an estimate of the variance signal; and
mathematically combining said estimate of the variance signal with a constant to output said threshold value.

7. A method as claimed in claim 6, wherein:
said mathematically combining multiples said estimate of the variance signal with said constant to output said threshold value.

8. A method as claimed in claim 5, wherein:
said comparing outputs a detection signal indicating detection of said data signal in said received signal when a level of said correlated signal is at least equal to said threshold value; and
said comparing outputs a non-detection signal indicating non-detection of said data signal in said received signal when a level of said correlated signal is less than said threshold value.

9. The system as claimed in claim 1, wherein the wireless communication network includes an ad-hoc wireless communication network in which the node is operating, and the first correlation circuit, second correlation circuit, threshold generating circuit and comparison circuit are present at the node.

10. A method as claimed in claim 5, wherein the wireless communications network includes an ad-hoc communication network in which the node is operating, and the first correlation operation, second correlation operation, generating and comparing are performed by the node.

* * * * *